(12) United States Patent
Kobayashi

(10) Patent No.: US 6,412,440 B2
(45) Date of Patent: Jul. 2, 2002

(54) SANITARY PET PATH

(76) Inventor: Shinobu Kobayashi, 122 Delhi Rd., Scarsdale, NY (US) 10583-1917

( * ) Notice: Subject to any disclaimer, the term of this patent is extended or adjusted under 35 U.S.C. 154(b) by 0 days.

(21) Appl. No.: 09/784,252

(22) Filed: Feb. 15, 2001

Related U.S. Application Data

(63) Continuation-in-part of application No. 09/505,758, filed on Feb. 16, 2000, now abandoned.

(51) Int. Cl.[7] ............................................. A01K 29/00
(52) U.S. Cl. ...................................... 119/161; 119/165
(58) Field of Search ................................ 119/422, 622, 119/703, 161, 416, 165, 170, 484

(56) References Cited

U.S. PATENT DOCUMENTS

| | | | | |
|---|---|---|---|---|
| 3,885,523 A | * | 5/1975 | Coleman | 119/165 |
| 4,021,975 A | * | 5/1977 | Calkins | 119/165 |
| 5,165,366 A | * | 11/1992 | Harvey | 119/165 |
| 5,195,464 A | * | 3/1993 | Mutter | 119/165 |
| 5,218,930 A | * | 6/1993 | Casmira | 119/161 |
| 5,220,886 A | * | 6/1993 | Hyde | 119/165 |
| 5,361,725 A | * | 11/1994 | Baillie et al. | 119/161 |
| 5,388,550 A | * | 2/1995 | Noble | 119/165 |
| 5,676,090 A | * | 10/1997 | Cannady, Jr. | 119/165 |
| 5,816,195 A | * | 10/1998 | Flynn | 119/165 |
| 6,109,211 A | * | 8/2000 | Tomlinson | 119/165 |
| 6,109,212 A | * | 8/2000 | Schacherbauer | 119/165 |
| 6,237,534 B1 | * | 5/2001 | Schwartz | 119/165 |

* cited by examiner

Primary Examiner—Charles T. Jordan
Assistant Examiner—John W. Zerr
(74) Attorney, Agent, or Firm—Milde & Hoffberg, LLP

(57) ABSTRACT

A sanitary cat path for use with a litter box, or a cat door; the sanitary cat path comprising an elevated apertured walkway operating to remove the litter or debris from the feet or paws of the cat so that the litter or debris will not be deposited on the floor, and/or tracked about the home; and preferably, providing a tray for capturing the litter or debris, and easily disposing of it.

7 Claims, 4 Drawing Sheets

SANITARY PET PATH

CROSS REFERENCE TO RELATED APPLICATION

This application is a continuation-in-part application of corresponding U.S. patent application Ser. No. 09/505,758, filed Feb. 16, 2000, now abandoned.

BACKGROUND OF THE INVENTION

The present invention is directed to a device for cleaning the feet of house cats that use a litter pan or box.

Though litter boxes provide a great convenience for cat owners, the litter, be it clay or granules, become caught in the pet's paws or feet, causing problems for the cat owner. Household pets typically have fur or hair, and a number of pads per paw. The litter material becomes temporarily caught in the hair and between the pads, and trailed along the floor or carefully ingested by the meticulous cat.

Sanitary pathways are not unknown, but such pathways have most commonly been developed for people. For example, sanitary manufacturing conditions may require the use of a sticky path to remove dirt from the sanitary cloth booted shoes of workers entering the sanitary manufacturing environment. A sticky path is inappropriate for household pets as the amount of litter trailed out of the box, or dirt trailed into the house, is too great, requiring too frequent changing of the sticky material.

Footbaths of water or disinfectant solutions have been used at the entrance to pools or spas, where wet feet are not a problem. Such is not the case for the cat re-entering the sanitary household. Multi-padded and furry feet can hold a lot of water (and thereby, dirt). In fact, footbaths for pets would increase the problems of the cat owners, by increasing the movement and tackiness of the litter, dirt or debris, allowing it to travel farther.

Open grids at the entrance to public buildings are used to prevent water accumulation and the possibility of slip and fall accidents. Open grids in heated air heating systems located at the entrance of a public building such as a store or office building may serve, unintentionally, to prevent water accumulation, and to rid the shoes of most of the debris acquired outdoors.

SUMMARY OF THE INVENTION

The present invention comprises a sanitary pathway for cleaning the feet of household cats. The sanitary cat path comprises an apertured walkway and elevational supports for the walkway. The apertured walkway may be a screen or lattice, through which cat litter, dirt or hair may easily pass. Wall panels, with or without a ceiling, or other means for encouraging or forcing the cat to traverse the length of the walkway, are also provided. The length of the walkway is at least the length of the gait of the cat. Debris which has fallen through the walkway is covered by the walkway and not visually obvious, or easily scattered across the floor. However, a removable clean-up tray may be provided, and positioned beneath the walkway to collect the dirt, litter, etc.

In one embodiment of the present invention, the sanitary cat path is located at the entrance/exit opening of a covered cat litter box. The cat path may be fixed about the entrance/exit of the covered cat litter box, or maintained at a short distance from the entrance/exit, such that the cat is encourage not to exit between the litter box and the walkway. A baseboard for the litter box may extend from the sanitary cat path, such that the weight of the litter box (and litter) maintains the walkway adjacent the litter box. The cat path may also be used in conjunction with a corralled litter box, where the walls of the corral encourage the cat to the opening of the corral and the walkway.

In another preferred embodiment of the present invention, the sanitary cat path is adapted to be placed in front of a cat door of the type which permits the cat to leave and reenter a building, such as a house. The cat path thus traps the dust and dirt which would otherwise be tracked into the house.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
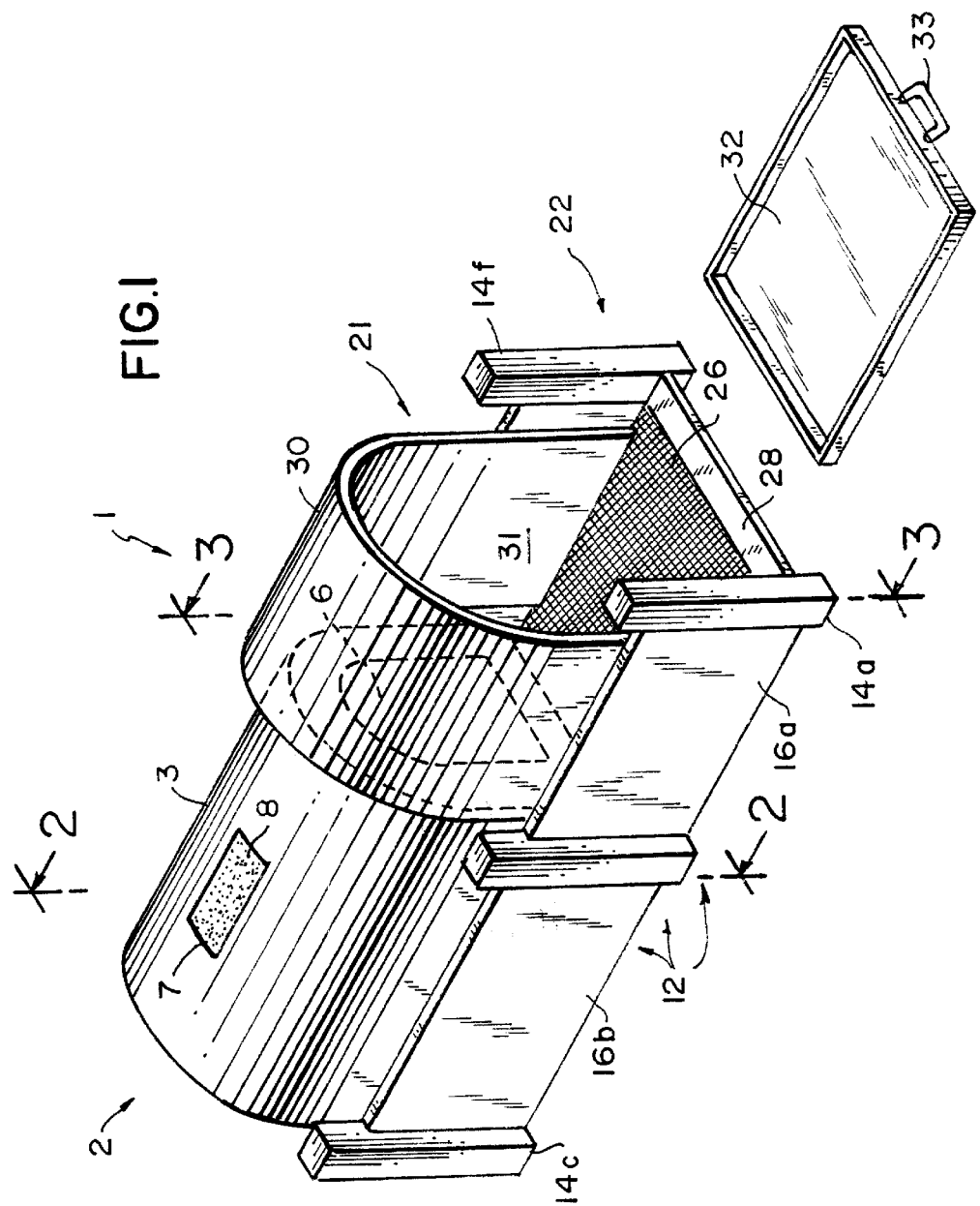
FIG. 1 is a perspective view of a cat litter box with one preferred embodiment of the sanitary cat path of the present invention.
Figure 2:
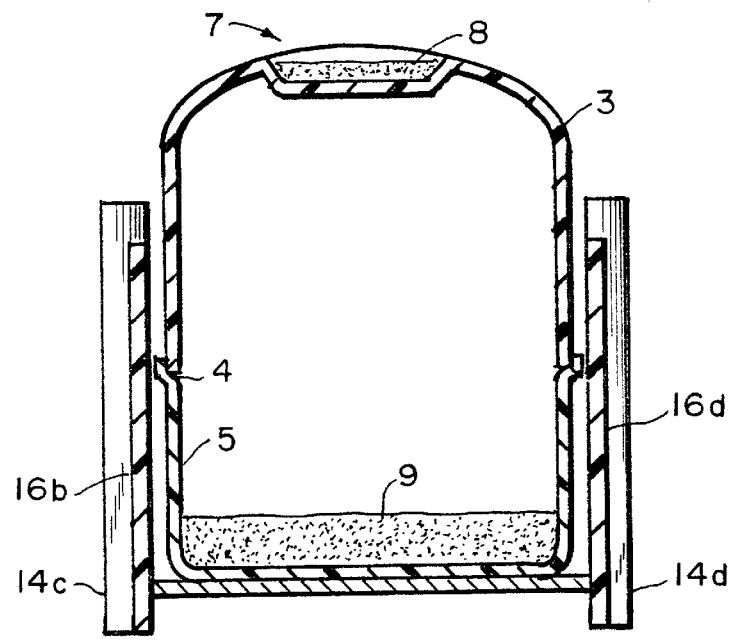
FIG. 2 is a cross-sectional view of the cat litter box portion in of the embodiment of FIG. 1, taken along line 2—2.
Figure 3:
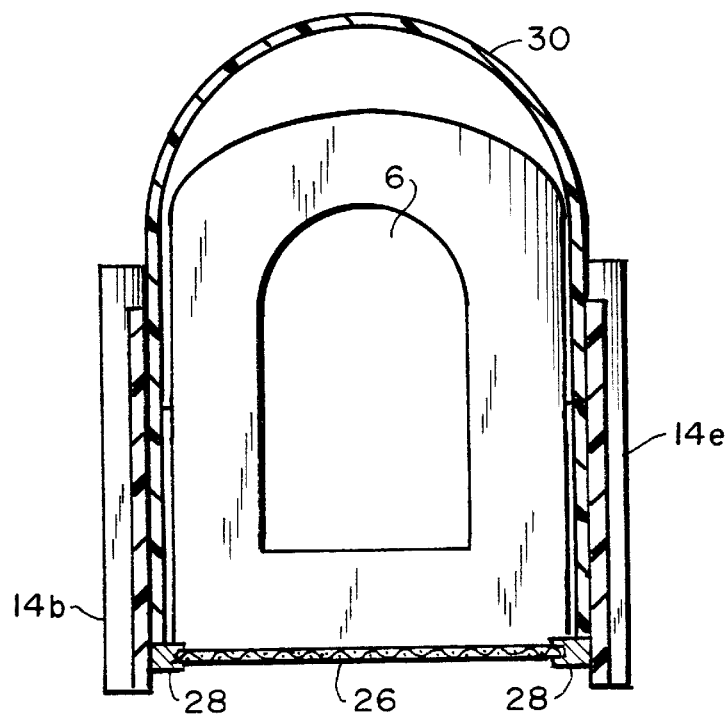
FIG. 3 is a cross-sectional view of the sanitary cat path of the embodiment of FIG. 1, taken along line 3—3.

The preferred embodiments of the present invention will now be described with reference to FIGS. 1–6 of the drawings. Identical elements in the various figures are designated with the same reference numerals.

FIGS. 1–4 illustrate one embodiment of the sanitary cat path of the present invention in combination with a covered cat litter box, thus providing an improved cat litter box.

The improved cat litter box is illustrated generally at 1. The improved cat litter box comprises a litter box 2, and a sanitary cat path 21 in a corral 12. The litter box may, optionally, have a lid 3 that fits within a lip 4 of the base 5. When the litter box does not have the lid, the walls 16b, c & d encourage the cat to exit the litter box through the sanitary cat path.

As shown, both the base and the optional lid have a generally rectangular horizontal cross-section. The optional lid for the cat litter box has a side wall entrance/exit opening 6 and may also have a ceiling vent 7 and filter 8 to contain the odors otherwise emitting from the cat litter box. The litter is contained within the base of the litter box, as shown at 9 in FIG. 2.

Figure 4:
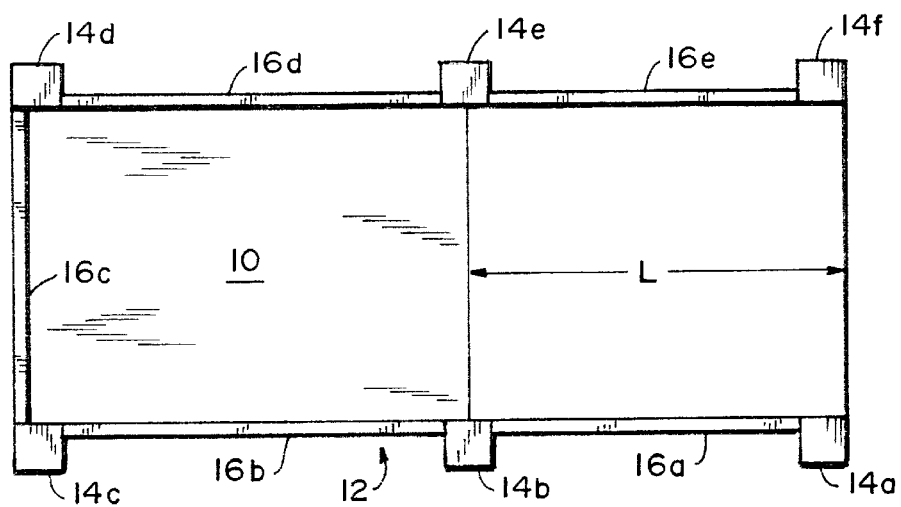
FIG. 4 is a bottom view of the embodiment of the invention shown in FIG. 1.

As shown in FIGS. 1–4, the sanitary cat path, 21 has been enclosed within a corral 12. As shown in FIG. 4, the corral comprises vertical posts 14a, 14b, 14c, 14d, 14e, and 14f; and sidewalls 16a, 16b, 16c, 16d and 16e. When the litter box is uncovered, the posts 14c & d and the sidewalls 16b, c & d encourage the cat to exit the litter box by means of the cat path. If the litter box is covered, posts 14c & d, and sidewalls 16b, c & d are not necessary to direct the cat, but a litter box baseboard 10 attached to the cat path, will keep the cat path adjacent the litter box opening. When the corral is maintained about the litter box, the litter box need not be covered, and the sanitary cat path need not be attached to the cat litter box or a baseboard, as long as the walls 16b, c & d and the ceiling of the cat path are sufficiently close to serve as a means or urge the cat to traverse the path.

The sanitary cat path comprises an elevated apertured walkway 22 of length L and means, such as a ceiling 30 to keep the cat on the walkway. Other means of attraction, such as toys or treats, or means of avoidance, such as electronic or sonic guides may also be used. As shown in FIG. 1, the ceiling 30 for the walkway 22 comprises a transparent material. An opaque material may also be used, and a window provided, if desired.

As shown in FIG. 1, the walkway comprises a screen 26, which in FIG. 1 is enclosed in a frame 28 to facilitate securing it to the elevational supports and securing it to the ceiling extensions 31. Neither the ceiling extensions 31 nor the frame 28 are made of material having apertures of sufficient size to let dirt, litter or hair pass through.

With the embodiment illustrated in FIG. 1, a baseboard supports the cat litter box, while the walls of the corral restrict the movement of the cat litter box with respect to the sanitary cat path. As shown in FIG. 1, a tray 32 may be placed under the apertured walkway between the posts 14a and 14f. A handle or knob 33 is provided on at least one vertical side of the tray to facilitate temporary removal of the tray for conveniently transporting the material therein to a disposal point, such as a waste container. Drawer runners or braces may be used to support the tray beneath the walkway, or the tray may be slid across the floor underneath the apertured walkway.

Figure 5:
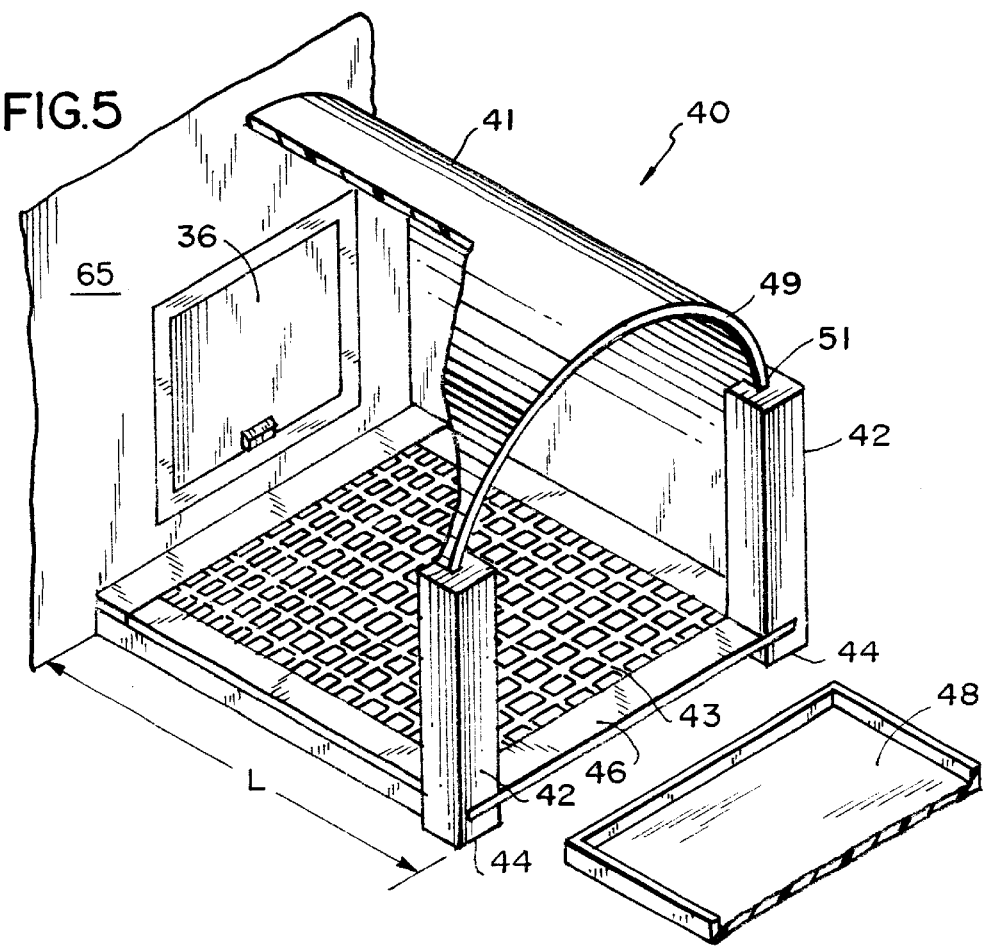
FIG. 5 is a perspective view of another preferred embodiment of the sanitary cat path of the present invention.

As shown in FIG. 5, the sanitary cat path 40 comprises a ceiling 41 attached to vertical supports 42 which provide elevational support for an apertured walkway, 43. The front edge 49 of the ceiling is held within vertical slots 51 in the supports 42 to form walls for the sanitary cat path.

The cat path further comprises an apertured walkway 43 and elevational supports 44. As shown in FIG. 5, the elevational supports for the walkway 43 may comprise the portion 44 of the posts 42 beneath the walkway. The apertured walkway may be formed of a plastic lattice. A frame 46 may be provided to strengthen the lattice and/or provide the means for creating good fastening to the supports.

As shown in FIG. 5, the ceiling is made of a transparent material. Though transparent or translucent materials are preferred, the ceiling may be constructed of a wide variety of materials. In one embodiment, the ceiling may be molded, its rigidity contributing to the sturdiness of the construction of the cat pathway. In another embodiment the ceiling may be formed of a flexible material that can be easily bent so that the edges may be inserted into the slots 51. With this construction, the ceiling (and optional wall extensions) may be packaged and shipped in a rolled configuration, reducing the size of the packaging for the cat pathway.

A tray 48 may also be provided, of a height no greater than the elevation of the apertured walkway, and having a length and width greater than that of the lattice exposed in the frame 46. However, it should be noted that the cat path for a cat door 36 may be located at the outside of the wall 65, requiring no tray.

It is preferable that the sanitary cat path extend at least a distance L corresponding to the gait of the cat for which the litter box is intended. As used herein the gait is the distance between the extended, opposite front and back paws, i.e. from the left forepaw extended forward to the right back paw extended rearward. When the cat path is formed of this length, each of the four paws of the cat will traverse the apertured walkway, releasing kitty litter from the paws as the cat enters the litter box.

Figure 6:
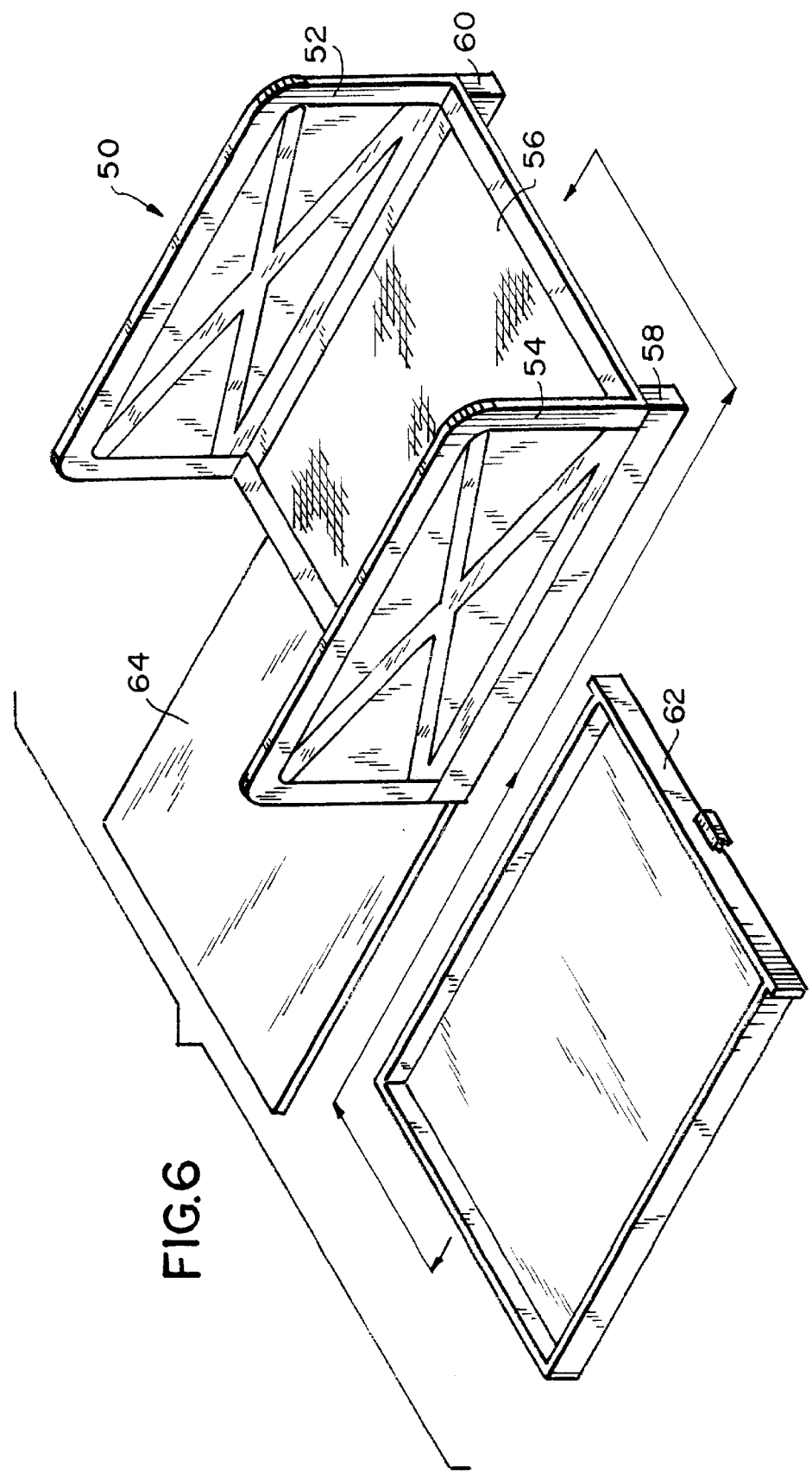
FIG. 6 is a perspective view of still another preferred embodiment of the sanitary cat path of the present invention.

FIG. 6 shows still another preferred embodiment of the sanitary cat path according to the present invention. In this embodiment, a central walkway portion 50 is provided with two side panels 52 and 54 on either side of the apertured walkway 56. In order to encourage or force the cat to traverse the walkway, the panels are of sufficient height (as shown in FIG. 6) as to make it difficult for a cat to walk over them. Elevational supports 58 and 60 are provided beneath each side panel member to maintain the walkway 56 in an elevated horizontal position.

A litter tray 62 is provided for insertion beneath the apertured walkway 56, between the elevational supports 58 and 60.

A flat panel 64 is removably attachable (or permanently fixed) to the bottom of the elevational supports 58 and 60 and is adapted to be placed beneath a covered cat litter box (not shown). The weight of the cat litter box will thus prevent the apertured walkway 56 from sliding away from the entrance opening of the cat litter box.

There has thus been shown and described a novel sanitary pet path which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A sanitary cat path for use with an enclosed cat litter box with a cat opening, or with a cat door, said cat path comprising, in combination:

an apertured walkway, extending at least a length of a gait of a cat, having a substantially horizontal path with a central linear axis;

elevational supports for the walkway, for maintaining the walkway in a horizontal position above the floor;

guide means for urging the cat to walk the walkway, said guide means comprising a substantially flat, vertical panel member on each side of the walkway and extending parallel to said linear axis, said panel members being of such height as to be difficult for a cat to walk over them;

a removable tray, disposed beneath the elevated, apertured walkway, for catching and disposing of any litter, dirt, or debris which passes through the walkway; and means for maintaining the walkway adjacent to a cat litter box, said maintaining means including a flat panel member, attached to one end of the walkway, adapted to be placed beneath the cat litter box;

wherein said cat path is adapted to be placed adjacent the litter box such that the central linear axis of the walkway passes through the litter box opening; and wherein the space above the walkway between the panel members is open and uncovered.

2. The sanitary cat path of claim 1, wherein the apertured walkway is a screen.

3. The sanitary cat path of claim 1, wherein the walkway is a lattice.

4. The sanitary cat path of claim 1, wherein the walkway is flexible.

5. The sanitary cat path of claim 1, wherein the cat litter box has a cover with an opening for ingress and egress of a cat, and wherein the walkway is adapted to be placed in front of said opening.

6. The sanitary cat path of claim 1, further comprising means for maintaining the walkway adjacent to a cat door.

7. The sanitary pet path of claim 3, wherein the lattice is made of plastic.

* * * * *